United States Patent [19]
Giroux

[11] 3,724,893
[45] Apr. 3, 1973

[54] FOLDABLE TENT CAMPING UNIT

[76] Inventor: Pierre R. Giroux, 3156 de Francheville St., Three Rivers, Quebec, Canada

[22] Filed: Sept. 13, 1971

[21] Appl. No.: 179,972

[52] U.S. Cl. ...................296/23 R, 296/27, 135/4 A
[51] Int. Cl. ...............................................B60p 3/34
[58] Field of Search .......296/23 R, 23 F, 23 G, 23 H, 296/27, 26; 135/4 A, 4 R, 1 A; 52/64

[56] References Cited

UNITED STATES PATENTS

| 3,506,299 | 4/1970 | Arnold et al. | 296/23 R |
| 3,288,521 | 11/1966 | Patnode | 296/23 R |

Primary Examiner—Philip Goodman
Assistant Examiner—John Carroll
Attorney—Pierre Lesperance

[57] ABSTRACT

A foldable tent camping unit particularly conceived for making a tent trailer, arranged when unfolded to cover about three times the ground surface covered by the same when folded, and using a convenient linkage and spring arrangement to produce spring assisted folding and unfolding. A tent trailer including a main platform section and one or two extension platform sections hinged to the former and of approximately the same size thereof, an elbow shape lever pivotally connected to the main platform section and to a corresponding extension platform section to pivot with the latter and a spring counteracting the weight of the corresponding extension platform section to assist folding and unfolding thereof. A tent material arranged to stay permanently fixed peripherally to the platform sections and erectable frames pivoted to the latter under said tent material and collapsibly supporting the latter.

15 Claims, 9 Drawing Figures

PATENTED APR 3 1973

INVENTOR
Pierre R. GIROUX
BY Pierre Lespérance
AGENT

INVENTOR
Pierre R. GIROUX
BY Pierre Lespérance
AGENT

PATENTED APR 3 1973  3,724,893

INVENTOR
Pierre R. GIROUX
BY Pierre Lespérance
    AGENT 3,724,893

FOLDABLE TENT CAMPING UNIT

This invention relates to a foldable tent camping unit and, more particularly, to a foldable tent trailer.

There are known concepts of foldable tent trailers having panels or platform sections providing, when unfolded, an extended camping space.

Each of the known foldable tent trailers presents one or more of the following disadvantages or limitations, taken either singly or in combinations. The floor surface remains the same when the trailer is unfolded. The extendible sections, when unfolded or extended, do not cover more than double the ground surface, which is covered by the trailer when folded. Complex mechanisms are used to displace the floor extension section. The tent material has to be peripherally detached at least in part from the solid sections to allow proper folding.

The present invention relates to a new concept of foldable camping unit or tent trailer which avoids the above disadvantages or limitations.

It is a general object of the invention to provide a foldable tent trailer which can be made into an unusually large unfolded size while being easy to fold and unfold by hand.

It is another object of the invention to provide a foldable tent trailer with a floor extension platform section pivotally connected to a main platform section and arranged for easy handling thereof.

It is a further object of the invention to provide a foldable tent camping unit with a main platform section and a pair of extension platform sections of approximately the same size to cover, when unfolded, substantially three times the ground surface covered thereby when folded.

It is another object of the invention to provide a foldable tent camping unit with a linkage and spring arrangement wherein the tension of the spring in conjunction with the pivoting of an associated extension platform section is harnessed in such a way as to counterbalance the weight of the latter, to assist both folding and unfolding of the same extension platform section.

It is a more specific object of the invention to provide a foldable tent camping unit with a main section and two pivoted sections arranged to fold one over another and provided with a tent material which remains permanently fixed peripherally to the pivoted sections.

The invention will now be described in detail with reference to preferred embodiments thereof which are illustrated, by way of example only, in the accompanying drawings, in which.

Figure 4:
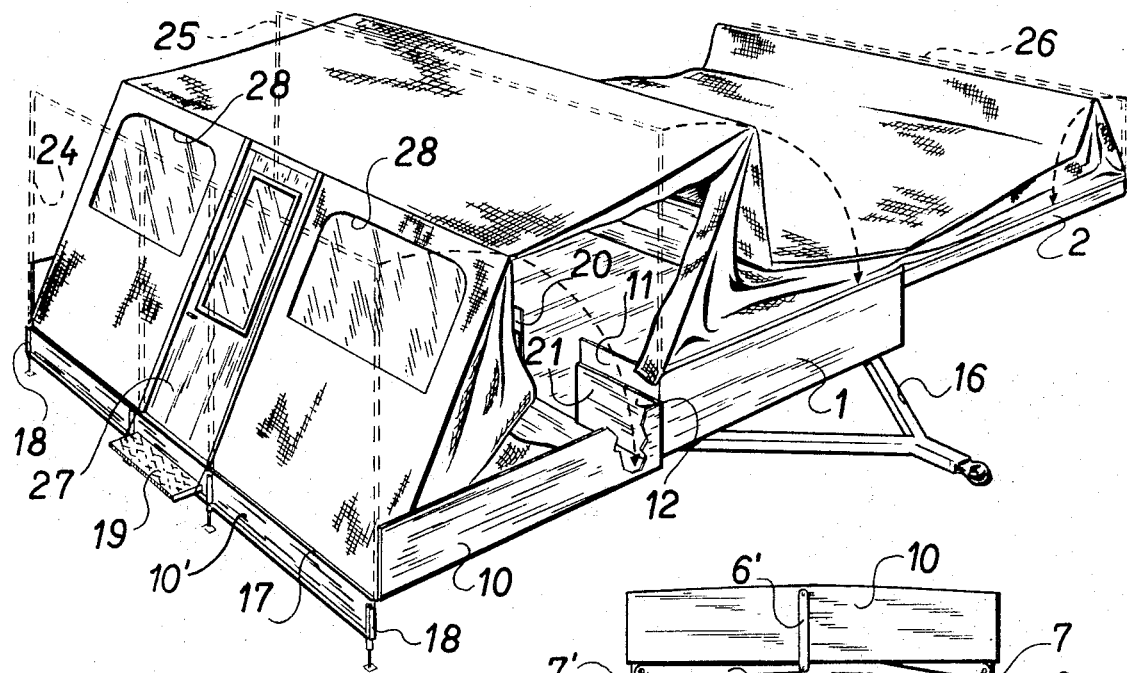
FIG. 4 is a perspective view of a second embodiment of a foldable tent trailer constructed according to the principle of the invention.
Figure 5:
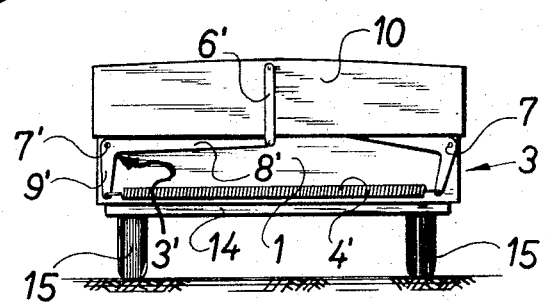
Figure 6:
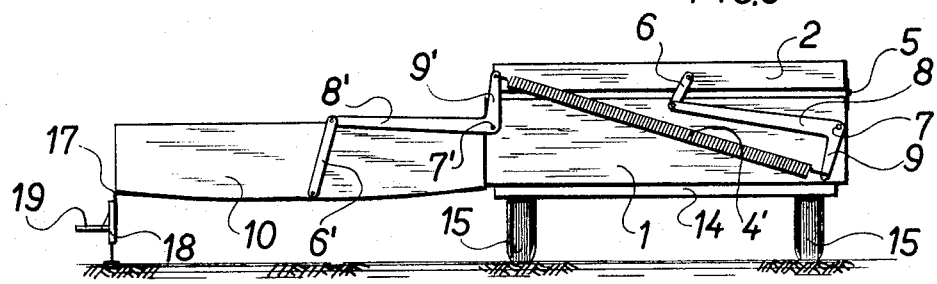
Figure 7:
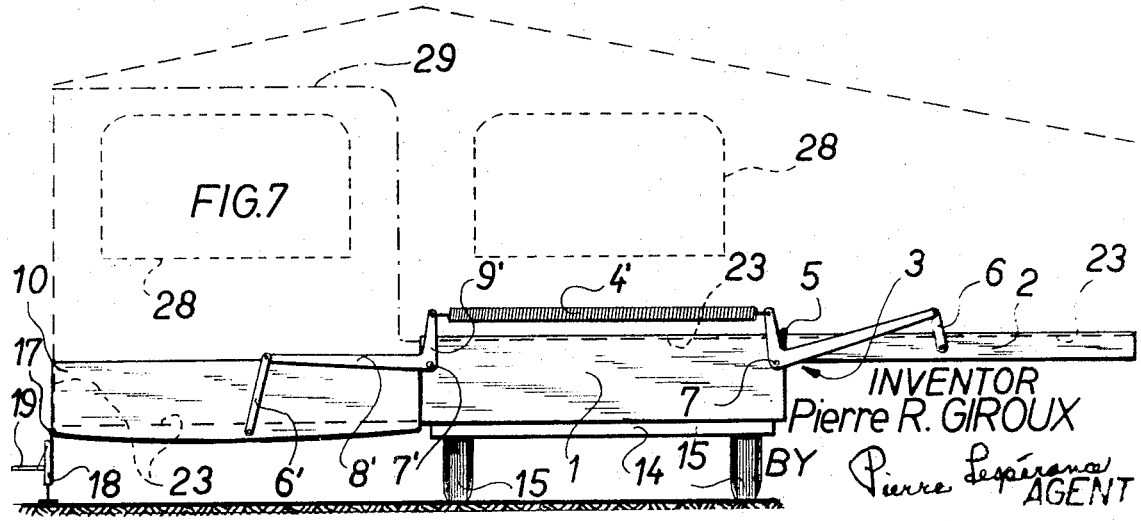
Figure 8:
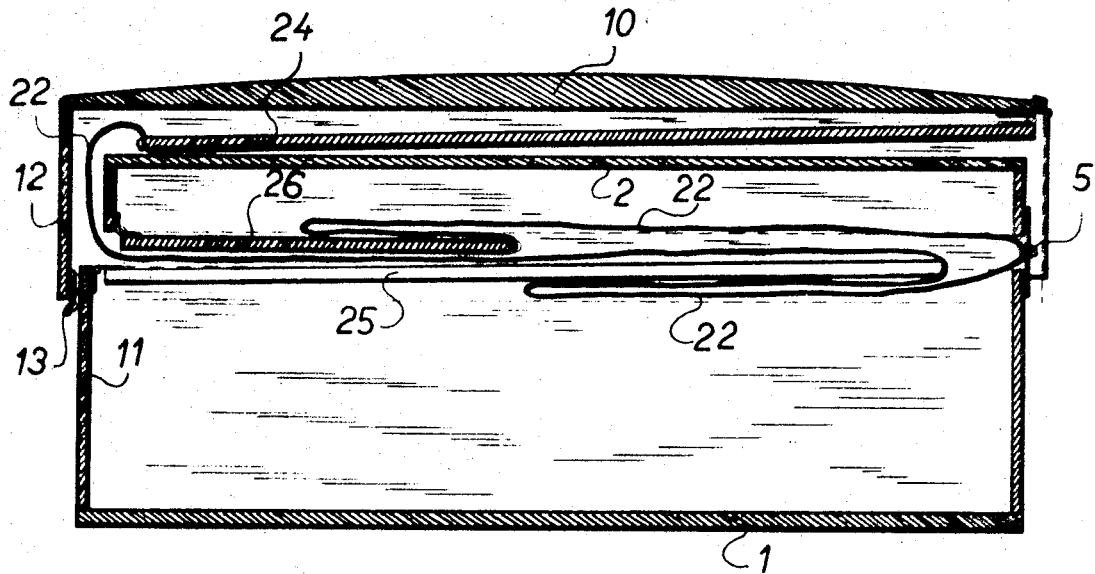
Figure 9:
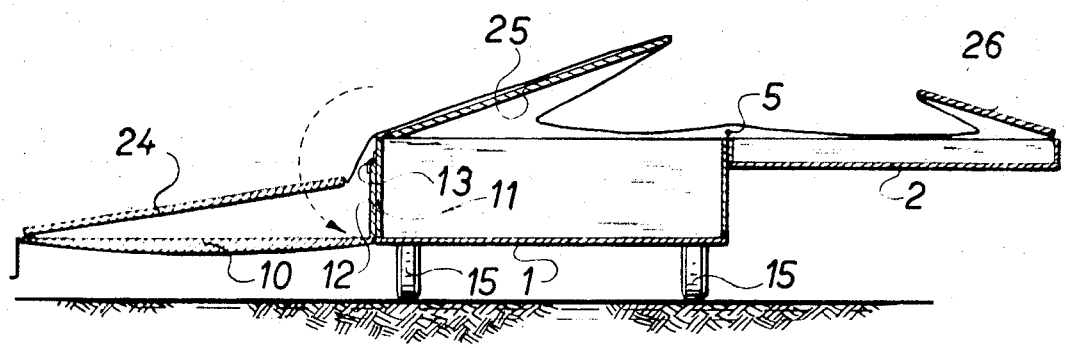

FIGS. 5, 6, and 7 are end views of the foldable tent trailer of FIG. 4, shown in folded, partly unfolded, and completely unfolded positions respectively;

FIG. 8 is a transverse cross-sectional view of the folded tent trailer shown in FIG. 5; and FIG. 9 is a transverse cross-sectional view of the unfolded tent trailer shown in FIG. 7.

Figure 1:
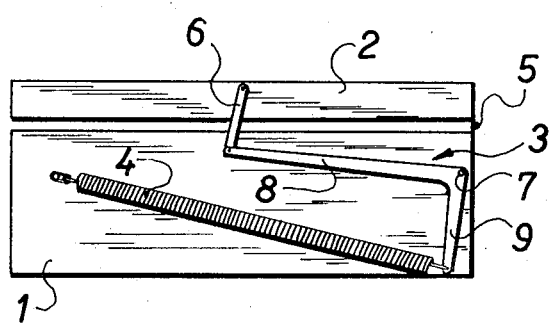
FIG. 1 is a schematic end view of a first embodiment of a foldable camping unit according to the invention.
Figure 2:
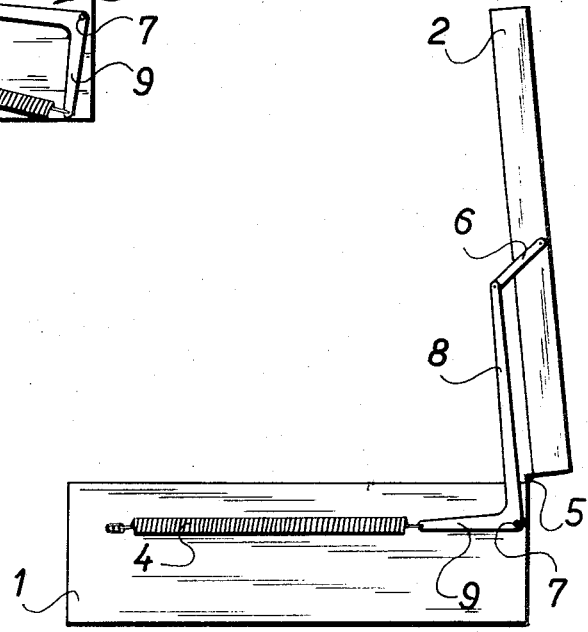
FIGS. 2 and 3 are end views corresponding to the view of FIG. 1 but showing the foldable elements in equilibrium and unfolded positions respectively.
Figure 3:
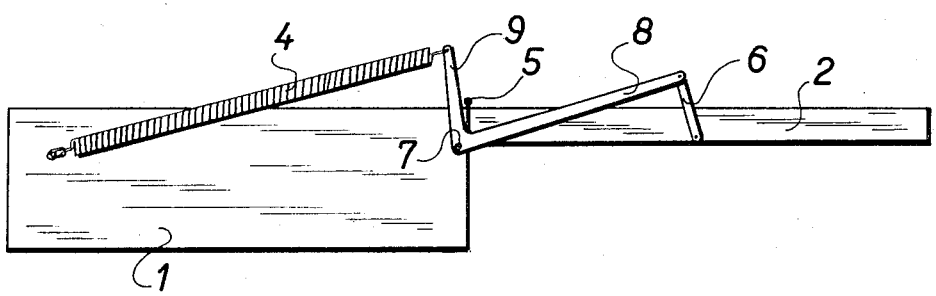

Reference will first be made to FIGS. 1, 2, and 3 which schematically illustrate an embodiment of the invention and, more particularly, the linkage and spring concept thereof, which is constructed and arranged to assist folding and unfolding of the tent camping unit.

The invention basically includes a main trailer platform section 1, an extension platform section 2, an elbow-shape lever 3, a spring 4, a hinge 5, and a compensating link 6. The section 1 constitutes a box open at the top, as are generally the trailer boxes of the most common types. The section 2 is arranged to form a bedding holding shallow box, as shown, or a cover for the section 1 and is like the latter provided with a peripheral wall arranged to confine camping equipment into the section 1. The lever 3 includes an elbow portion which is pivoted at 7 to one end of the main platform section 1, a lever arm portion 8 which is pivotally connected at the free end to one end of the compensating link 6 and a lever arm portion 9 which has one end of the spring 4 secured thereto. The other end of the compensating link 6 is pivoted to the cover or extension platform section 2. The hinge 5 may be of any suitable type to pivotally support the section 2 along one lateral edge or side wall of the main platform section 1. The spring 4 is fixedly secured at its other end relative to the main platform section 1.

It will readily be understood by comparing FIGS. 1, 2, and 3 that the lever 3 is displaced with the extension platform section 2, whereby the free end of the lever arm portion 9 describes a circular path which passes closest to the fixed end of the spring 4 when the section 2 is in the elevated intermediate equilibrium position, shown in FIG. 2. In the equilibrium position, the section 2 has its weight acting vertically onto the hinge 5 thereof and the tension of the spring 4 is directed radially relative to the pivot 7.

When the extension platform section 2 is being either folded or unfolded from the equilibrium position, the spring 4 is extended, causing an increase of tension into the latter. The linkage and spring arrangement is conceived to produce a tension in the spring 4 in the fully folded and unfolded positions of the section 2, which almost but not quite completely counteracts the weight of the section 2. There results that the spring 4 assists the lifting of the section 2 from the folded and unfolded positions, FIGS. 1 and 3 respectively, whereby only a slight force is required to initiate the lifting operation. After pivoting of the extension platform section 2 passed the equilibrium position of FIG. 3, the tension of the spring 4 starts to increase and to assist the operator in lowering the section 2 against the action of the weight thereof.

There results that the automatic loading of the spring 4 under the action of the weight of the section 2, requires only limited energy to be expanded by the user or operator.

As illustrated in FIGS. 4 to 9 inclusive, the invention is particularly embodied into a foldable tent trailer including a second pivoted platform section 10 which forms a cover having a peripheral wall adapted to confine the extension platform section 2 in the folded position. Contiguous side walls 11 and 12 of the platform sections 1 and 10 respectively are hinged together by any suitable hinge 13. The extension platform section 10 is similarly pivoted as section 2 by a linkage and spring arrangement including an elbow-shape lever 3', a compensating link 6', a pivot 7', and lever arm portions 8' and 9'. A spring 4' interconnects the free ends of the lever arm portions 9 and 9' and is arranged, as spring 4, to vary its tension in relation to the pivoting of either one or both pivoted sections 2 and 10 to counterbalance the weight of the latter.

The main platform section or trailer box 1 is provided with vehiculating elements of conventional types including a trailer frame 14, road wheels 15 and a trailer hitch bar 16.

The extension platform section 10 forms a hardtop cover when the unit is folded for travel or storage and extends the floor surface when in the unfolded position shown in FIGS. 4, 6, 7, and 9. In the latter position, the side panel 10' is pivoted at the laterally distal edge 17 of the cover forming section 10 to form a support or beam for the latter, and includes adjustable legs 18 and a ratractable footstep 19, of any convenient construction. The contiguous side walls 11 and 12 of the main platform section, or trailer box 1, and the extension platform section 10 are provided with door openings 20 and 21 respectively registering with each other to form a passageway extending from one section to the other. Of course, a door or panel, not shown, is provided to close off the above entry.

A tent material 22, of any suitable kind and construction, is fixed onto the unfolded platform sections 1, 2, and 10 along the exterior edges thereof, as indicated by the dashed lines 23 in FIG. 7. Frame members 24, 25, and 26 of tubular or panel type are pivotally mounted under the tent material 22 and onto the platform sections 10, 1, and 2 respectively and extend parallel to the longitudinal hinges 5 and 13. A door 27 and window 28 are provided as desired through the tent material 22 and into the frame members 24, 25, and 26.

In order to obtain the desired collapse of the tent material 22, a closing slit 29, provided with a zipper or the like for the closing thereof, is formed at each end of the cover forming section 10 and extends diagonally or otherwise from the lowermost edge thereof adjacent the wall 21 to the top edge of the frame member 24. The tent material 22 is preferably fixed to the top edge of each of the frame members 24, 25, and 26, whereby the folding and unfolding of the latter will entrain the tent material, resulting in the production of neat and long folds, as shown in FIGS. 4, 8, and 9. A compact folding is thus obtained which hence leaves storage space for camping equipment onto the floor of the trailer box section 1.

It must be appreciated that the three sections 1, 2, and 10 are of approximately the same size and, therefore, produce a foldable tent camping unit which is arranged, when unfolded, to overlie generally three times the ground surface overlied when folded. There results an unusually roomy foldable tent trailer.

It should be noted that one set of linkage and spring arrangement is provided at each end of the trailer or camping unit. The set of linkage and spring arrangement unit at the front of the trailer in FIG. 4, has been omitted to better illustrate the parts of the platform sections and the tent thereon.

I claim:

1. In a foldable tent camping unit, the combination comprising a main platform section forming a tent trailer box, vehiculating means secured to said tent trailer box to support the latter for travel, one extension platform section forming a cover arranged to close the top of said tent trailer box, hinge means pivotally connecting said main platform section to said extension platform section along one edge thereof to allow pivoting of the extension section between a folded transport and storage position closing said tent trailer box and an unfolded camping position adjacent said main platform section, lever means connected to said one extension platform section and arranged to pivot with the latter, a relatively strong tension spring arranged to be anchored relative to said main platform section and to said lever means, the latter being arranged upon pivoting, to change the tension of said spring, to increase the tension upon approaching said folded and unfolded positions, and to decrease the tension upon approaching an intermediate equilibrium position.

2. A foldable tent camping unit as defined in claim 1, wherein said lever means is a linkage pivotally connected to said main platform section.

3. A foldable tent camping unit as defined in claim 1, wherein said lever means includes a pivoted lever having a pivot point on said main platform section, and said strong tension spring and said extension platform section are connected to said lever distally from said pivot point and are arranged whereby the weight of said extension platform section and the force of said tension spring counteract each other.

4. A foldable tent camping unit as defined in claim 1, wherein said lever means includes an elbow-shape lever having an elbow portion intermediate a pair of lever arm portions, said elbow portion defines a pivot point onto said main platform section, said strong tension spring and said one extension platform section are connected each to a respective one of said lever arm portions and are arranged to cause the tension of said spring to counteract the weight of said one extension platform section on said elbow-shape lever.

5. A foldable tent camping unit as defined in claim 4, wherein said elbow-shape lever is constructed and arranged relative to said tension spring and to said one extension platform section to provide an equilibrium position whereat the weight of the extension platform section and the tension in said spring are effectively inactive on said elbow-shape lever.

6. A foldable tent camping unit as defined in claim 1, further including another extension platform section hingedly connected to said main platform section along another edge thereof opposite said one edge and arranged to pivot between a folded and an unfolded position, another lever means connected to said another extension platform section and arranged to pivot with the latter, both said lever means are arranged in generally the same transverse plane relative to the hinge axes of said extension platform sections and the ends of said tension spring are anchored to said lever means, the latter are both constructed and arranged to increase the tension of said spring upon approaching any of said folded and unfolded positions of any of said extension platform sections.

7. A foldable tent camping unit comprising three platform sections of relatively the same size hinged one to another and arranged to fold one over another for storage and travel, and to unfold to overlie generally three times the ground surface overlied when folded, wherein one of said platform sections constitutes a main platform section having a pair of opposite edges, the others of said platform sections constitute extension platform sections, a first hinge means pivotally connects one of said extension platform sections to one of said opposite edges, a second hinge means pivotally connects the other of said extension platform sections to the other of said opposite edges, said extension platform sections are arranged to unfold and extend laterally outwardly adjacent said opposite edges of said main platform section and wherein said main platform section forms a tent trailer box, said one extension platform section forms a cover arranged to close the top of said tent trailer box, said second hinge means is arranged to cause said other extension platform section to fold under said cover and over said tent trailer box to allow closing of the latter, and said vehiculating means is fixed to said tent trailer box to support the latter for travel.

8. A foldable tent camping unit as defined in claim 7, wherein said main platform section and said one extension platform section are each provided with a peripheral wall, said peripheral walls are constructed and arranged to laterally confine said other extension platform section when said extension platform sections are folded into travel position, and said one extension platform section is constructed and arranged, when unfolded, to extend level with the main platform section of said trailer box to form a floor extension thereof.

9. A foldable tent camping unit as defined in claim 8, wherein each of said peripheral walls defines a pair of opposite side walls, the opposite side walls of said main platform section extend along said opposite edges, one of said side walls of said one extension platform section extends contiguous to one of said side walls of said main platform section, said first hinge means pivotally connects said contiguous one side walls, the latter are provided with registering door openings arranged to form a passageway between said main platform section and said one extension platform section, when the latter is unfolded, and an access into said trailer box when said one extension platform section is folded over said trailer box.

10. A foldable tent camping unit as defined in claim 9, wherein said other extension platform section forms a relatively shallow box constructed and arranged to hold bedding for pivoting displacement therewith.

11. A foldable tent camping unit as defined in claim 7, further comprising a tent including a collapsible tent material peripherally fixed to said platform sections and arranged to permanently remain peripherally fixed to the latter in both folded and unfolded positions thereof.

12. A collapsible tent camping unit as defined in claim 11, wherein portions of said tent material which are fixed to said one extension platform section and which extend transversely to and adjacent the axis of said one hinge means, are provided with closing slits extending laterally outwardly from the bottom edge of said portion adjacent said axis and arranged to be opened to allow predetermined collapse of said tent material.

13. A collapsible tent camping unit as defined in claim 9, further comprising a tent including a collapsible tent material and erectable frame members for said collapsible tent material, the latter is peripherally fixed to said platform sections and arranged to permanently remain peripherally fixed to the latter in both folded and unfolded positions thereof, one of said frame members is pivotally mounted to each of said platform sections under said collapsible tent material and is arranged to fold into a collapsed position onto the corresponding platform section and within the confines of said peripheral walls.

14. A collapsible tent camping unit as defined in claim 13, further including a pair of elbow-shape levers pivotally connected to each end of said main platform section, and relatively strong tension springs, each of said elbow-shape levers having an elbow portion and two lever arm portions extending substantially at right angle to each other at said elbow portion, said tension springs being positioned intermediate said elbow-shape levers and being connected to one lever arm portion of each of said levers, and a link pivotally connected to each of the other lever arm portions and to a corresponding one of said extension platform sections, whereby the tension of said springs counteracts the weights of said extension platform sections and is changed by the pivoting of the latter to assist folding and unfolding thereof.

15. A collapsible tent camping unit as defined in claim 9, wherein said one extension platform section includes a pivoted side panel constructed and arranged to be unfolded into engagement with the ground to form a supporting beam for said one extension platform section.

* * * * *